(12) United States Patent
Canders et al.

(10) Patent No.: US 6,541,885 B2
(45) Date of Patent: Apr. 1, 2003

(54) MAGNETIC BEARING ASSEMBLY

(75) Inventors: Wolf-Rüdiger Canders, Osterode (DE); Hardo May, Braunschweig (DE)

(73) Assignee: Atlas Copco Energas GmbH, Köln (DE)

( * ) Notice: Subject to any disclaimer, the term of this patent is extended or adjusted under 35 U.S.C. 154(b) by 0 days.

(21) Appl. No.: 10/088,375

(22) PCT Filed: Jul. 17, 2001

(86) PCT No.: PCT/DE01/02602

§ 371 (c)(1),
(2), (4) Date: Mar. 15, 2002

(87) PCT Pub. No.: WO02/06688

PCT Pub. Date: Jan. 24, 2002

(65) Prior Publication Data

US 2002/0135249 A1 Sep. 26, 2002

(30) Foreign Application Priority Data

Jul. 18, 2000 (DE) .......................................... 100 34 922

(51) Int. Cl.$^7$ ................................................. H02K 7/00
(52) U.S. Cl. ......................... 310/90.5; 310/90; 308/10; 505/903
(58) Field of Search .......................... 310/90.5, 90, 103

(56) References Cited

U.S. PATENT DOCUMENTS 5,633,547 A * 5/1997 Coombs .................... 310/90.5
5,710,469 A    1/1998 Ries

FOREIGN PATENT DOCUMENTS

DE   197 27 550    2/1998
EP   0 526 325     2/1993

OTHER PUBLICATIONS

M. Komori et al. (1997) "Vibration Suppression of a Disk–Shaped Superconductor with PD Control", Cryogenics, IPC Science and Technology Press Ltd., Guildford, GB, vol. 37 No. 4, pp. 195–199.

* cited by examiner

Primary Examiner—Thomas M. Dougherty
Assistant Examiner—Iraj A Mohandesi
(74) Attorney, Agent, or Firm—Collard & Roe, P.C.

(57) ABSTRACT

The invention relates to a magnetic bearing assembly of a rotor in a stator, with at least one magnetic bearing (1) comprising a stator part (2) and a rotor part (3) arranged coaxially thereto in the operating position without contacting the stator part. The bearing effective area of the rotor part is formed by a radial exciting system (6) having a permanent magnet (4), while the stator part (2) comprises a high-temperature superconductor concentrically surrounding the radial exciting system (6) while maintaining an annular air gap (10). For increasing the specific rigidity of such a bearing, it is proposed according to the invention that the high-temperature superconductor is divided in at least two HTSC partial shells (7, 8) which, after the transition into the superconducting state, can be displaced against one another by an actuator (12) in the radial direction from a position in the hot state of the bearing, in which each HTSC partial shell (7', 8') has a first radial spacing (k) from the radial exciting system (6), into a working position with a second, smaller radial distance (operating gap (o) from the radial exciting system (6).

11 Claims, 4 Drawing Sheets

MAGNETIC BEARING ASSEMBLY

CROSS REFERENCE TO RELATED APPLICATIONS

Applicants claim priority under 35 U.S.C. §119 of German Application No. 100 34 922.6 filed Jul. 18, 2000. Applicants also claim priority under 35 U.S.C. §120 of PCT/DE01/02602 filed Jul. 17, 2001. The international application under PCT article 21(2) was not published in English.

The invention relates to a magnetic bearing assembly of a rotor in a stator comprising at least one magnetic bearing that has a stator part and a rotor part which, in the operating position, is arranged coaxially thereto without contacting said stator part. The bearing effective area of the rotor part is formed by a radial exciting system containing permanent magnets, whereas the stator part has a high-temperature superconductor that concentrically surrounds the radial exciting system while maintaining an annular air gap.

Such an embodiment is disclosed, for example in DE 197 27 550 A1. Said earlier publication discloses, among other things, a magnetic bearing in connection with which the rotor is supported in two magnetic bearings, which axially oppose each other and are formed in a mirror-imaged manner in relation to one another with respect to their shape of truncated cones. A defined cooling method is described for such a magnetic double bearing, which is understood to be the type of transition leading into the superconducting state. According to said method, one of the two magnetic bearings is cooled first and subsequently the other magnetic bearing. While being driven to cold, the rotor is first displaced with its one bearing segment into the one magnetic bearing up to the stop, and subsequently into the other magnetic bearing up the stop. After both magnetic bearings have cooled down, an axial tensioning of the two-effective bearing segments of the rotor is obtained. According to a modified method for driving the rotor into its operating position with the use of a magnetic double bearing, a rotor with a vertical axle is employed, which is displaced upwards into the upper magnetic bearing until the rotor part comes to rest against its stator part, whereupon both magnetic bearings are driven to cold simultaneously and the rotor is subsequently released.

The following terms have come into use linguistically for three different cooling methods:

Cooling without field (zero field cooling)=ZFC.
Cooling under the operational field in the operational position, or with displacement into the operational position (operational field cooling)=OFC and (operational field cooling with offset)=OFCo; or
cooling while approaching the exciter magnet as closely as possible (maximum field cooling)=MFC.

The feature that all of said methods have in common is that the structural component to be supported, for example the rotor of a machine, has to be shifted after cooling from a cooling position into the operational position by forces, e.g. by its own weight or by the operational load. Because of the non-linear spring characteristic of the bearing, which is frequently progressive at OCC, OFCo, ZFC, but degressive at MFC, said shift requires a minimum distance in order to arrive at a working point with adequate rigidity. It is often required in this connection as a secondary condition that the working point of the bearing coincides with the geometric center line of the housing of the bearing. In many cases of application, however, said available degree of freedom of the rotor is highly limited for constructional reasons. The consequence thereof is that the required rigidity of the bearing at the working point has to be adjusted by an accordingly sized surface. This, however, results in unnecessarily high costs and unpractical dimensions of the bearing.

Therefore, the problem is based on the problem of enhancing the specific rigidity of superconducting bearings while avoiding the drawbacks described above.

Based on a magnetic bearing of the type specified above, said problem is solved according to the invention in that the high-temperature superconductor is divided in at least two circle segment-shaped HTSC partial shells which, when the bearing is hot, can be displaced with respect to each another in a radial direction by an actuator, from a position in which each HTSC partial shell has a first radial distance from the radial exciting system, into a working position having a second, smaller radial distance (operating gap) from the radial exciting system.

For compensating the weight of the rotor it may be useful if the two half-shells, in their hot position, have different first radial distances from the radial exciting system.

Furthermore, the magnetic bearing as defined by the invention may be characterized by an additional axial bearing in connection with which two axial exciting systems arranged opposing each other with an axial distance from each other. Said systems each are fitted with permanent magnets, forming an axially directed, circular disk-shaped effective bearing area of the rotor part, with a plane, circular disk-shaped HTSC axial bearing disk arranged coaxially in relation to the rotor part being associated with each of said effective bearing areas as the stator parts, whereby said HTSC axial bearing disks can be displaced away from each other by an actuator in the axial direction after the transition into the superconducting state, from a position in the hot state of the bearing, in which each HTSC axial bearing disk has a first axial distance from the associated axial exciting system, into a working position with a second, smaller axial distance from the axial exciting system.

Additional features of the invention are the objects of the dependent claims and are explained in greater detail in connection with further advantages of the invention with the help of exemplified embodiments.

The drawing is a schematic representation of two exemplified embodiments of the invention. In the drawing, FIG. 1 is a longitudinal section through a magnetic radial bearing of a rotor.

Figure 1:
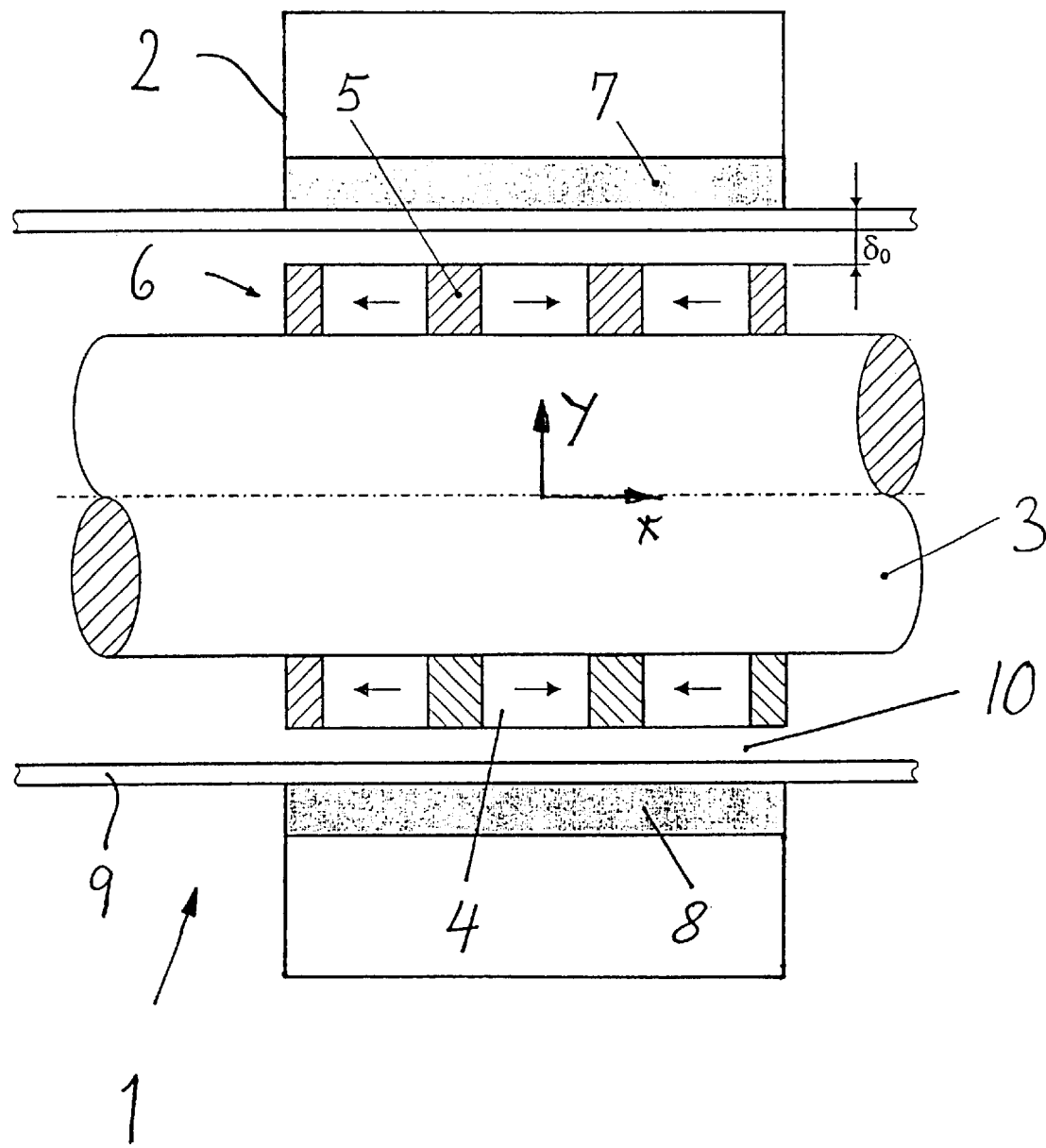

FIG. 1 shows a radial magnetic bearing 1 comprising a stator part 2 and a rotor part 3 shown in the form of a shaft arranged coaxially in relation to the stator part in the operating position without contacting the stator part. The bearing effective area of the rotor part is formed by a permanent magnet 4 with a radial exciting system 6 having the interconnected pole shoes 5.

The stator part 2 comprises a high-temperature superconductor (HTSC) that concentrically surrounds the radial exciting system 6 while maintaining an annular air gap 10. According to the invention, said superconductor is divided in the two circle segment-shaped HTSC half-shells 7, 8, which are covered on their sides facing the radial exciting system 6 with a thermal insulation 9, and which, in the working position shown in FIG. 1, have a radial spacing 0 from the radial exciting system 6 forming the bearing effective area.

Figure 2:
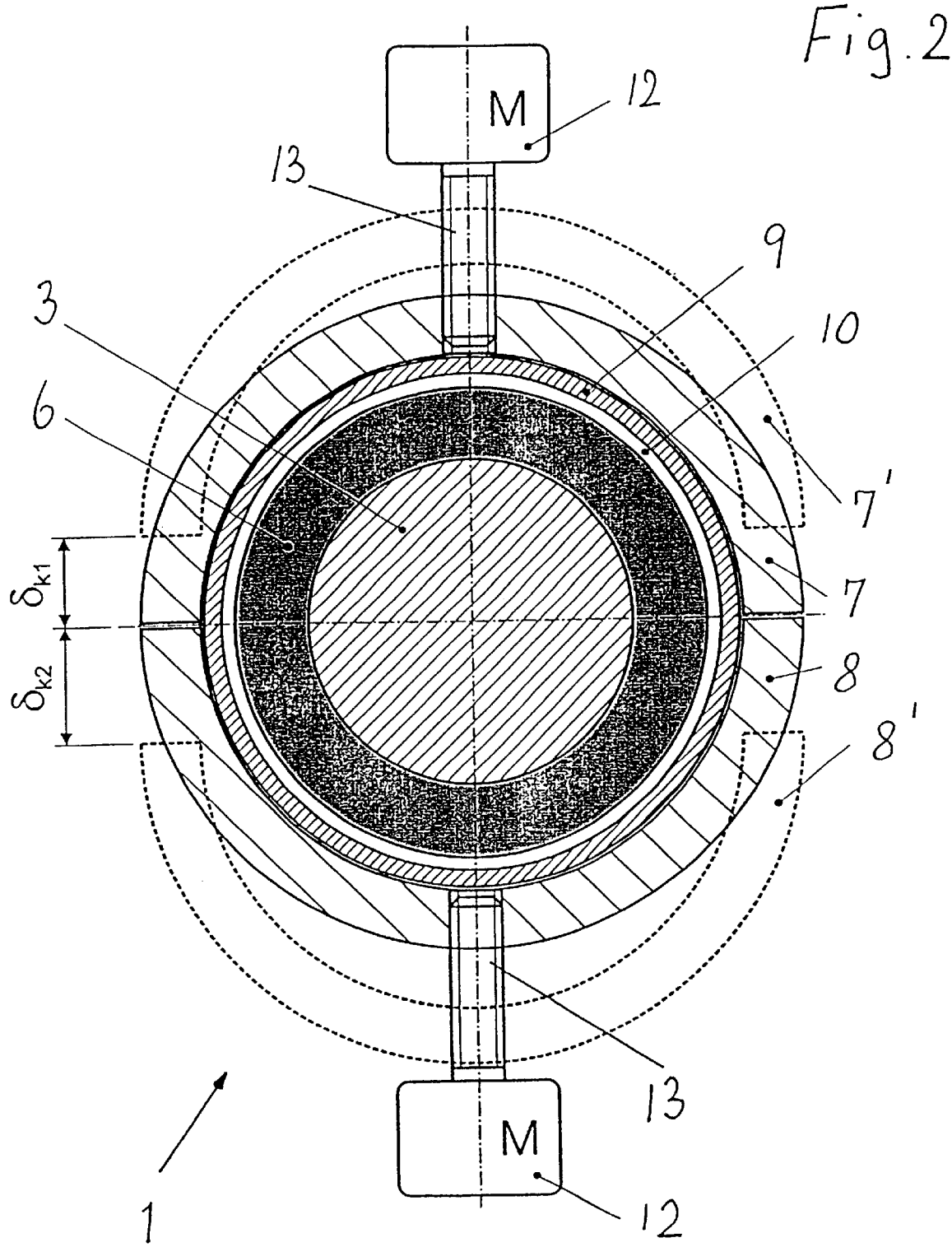
FIG. 2 is a cross section through a magnetic radial bearing shown on a slightly enlarged scale vis-à-vis FIG. 1.

FIG. 2 shows that in the hot state of the bearing, the two HTSC half-shells 7 and 8 assume the positions shown by dashed lines. When located in said positions, the upper HTSC half shell 7' has a radial spacing $k_1$ from the center separation joint 11, and the lower HTSC half-shell 8' has a radial spacing of $k_2$, whereby in the exemplified embodiment shown, $k_2 > k_1$. Prior to the transition into the superconducting state, the HTSC half-shells 7, 8 are driven apart with the help of an actuator 12 that may comprise a motor spindle 13, into the positions drawn by dashed lines, so that a radial air gap thickness $k > 0$ is obtained. After the bearing has cooled down to below the transition temperature, the HTSC half-shells 7, 8 are driven together with the help of the actuators 12 into the working position shown by the fully drawn lines until the operating gap 0 shown in FIG. 1 is adjusted.

Figure 4:
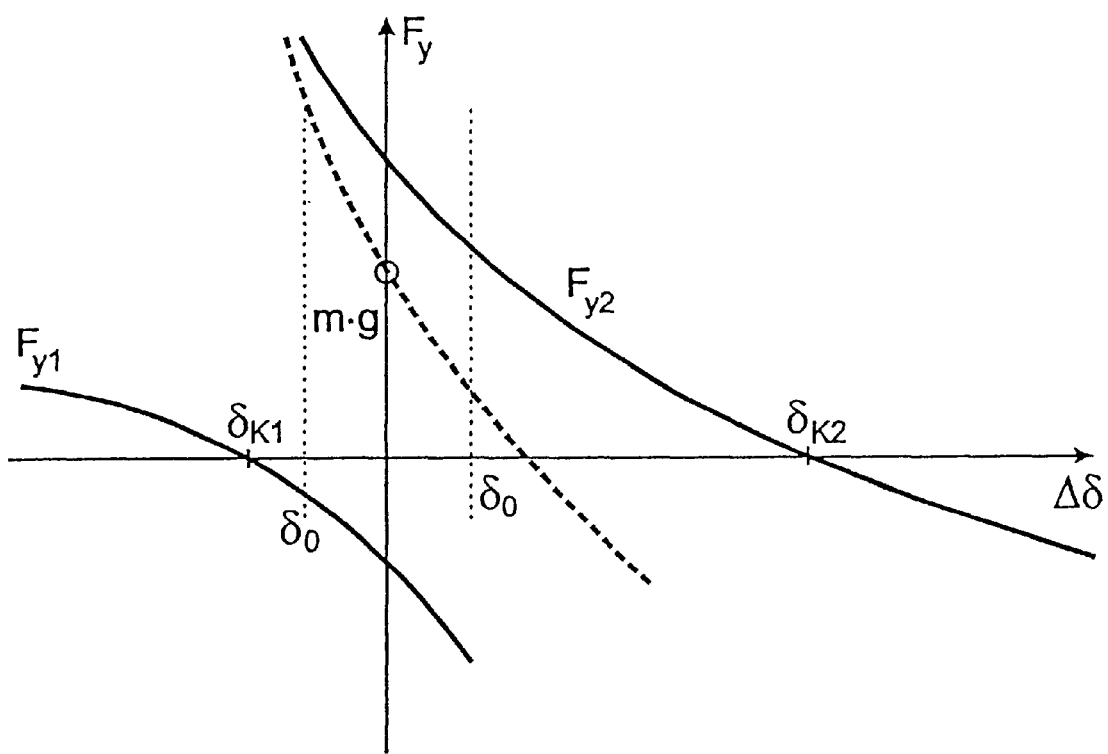
FIG. 4 shows force-distance characteristics for an upper and a lower bearing half of an embodiment according to FIG. 2.

According to FIG. 2, different values are selected for the radial gaps $k$ for the upper and the lower bearing shells 7', 8' in order to achieve through such asymmetry a compensation of the weight of the rotor, whereby the rotor part 3 remains almost exactly in the geometric center of the radial magnetic bearing 1. Because of the now progressive force-distance characteristic for the upper HTSC half-shell 7 and the lower HTSC half-shell 8, it is possible with a corresponding design of the actuators 12 to adjust a working point of the bearing that has a distinctly higher rigidity in the working point. Reference is made in this regard to FIG. 4, where the basic characteristics of the OFCo method are shown for the upper and the lower half-shells 7 and 8. In said diagram, the point m·g shown on the $F_y$ axis of force indicates the weight of the entire rotor.

By superimposing the rigidity characteristics it is possible to achieve for each HTSC half-shell/radial exciting system combination an increased rigidity of the overall bearing in the working point.

Figure 3:
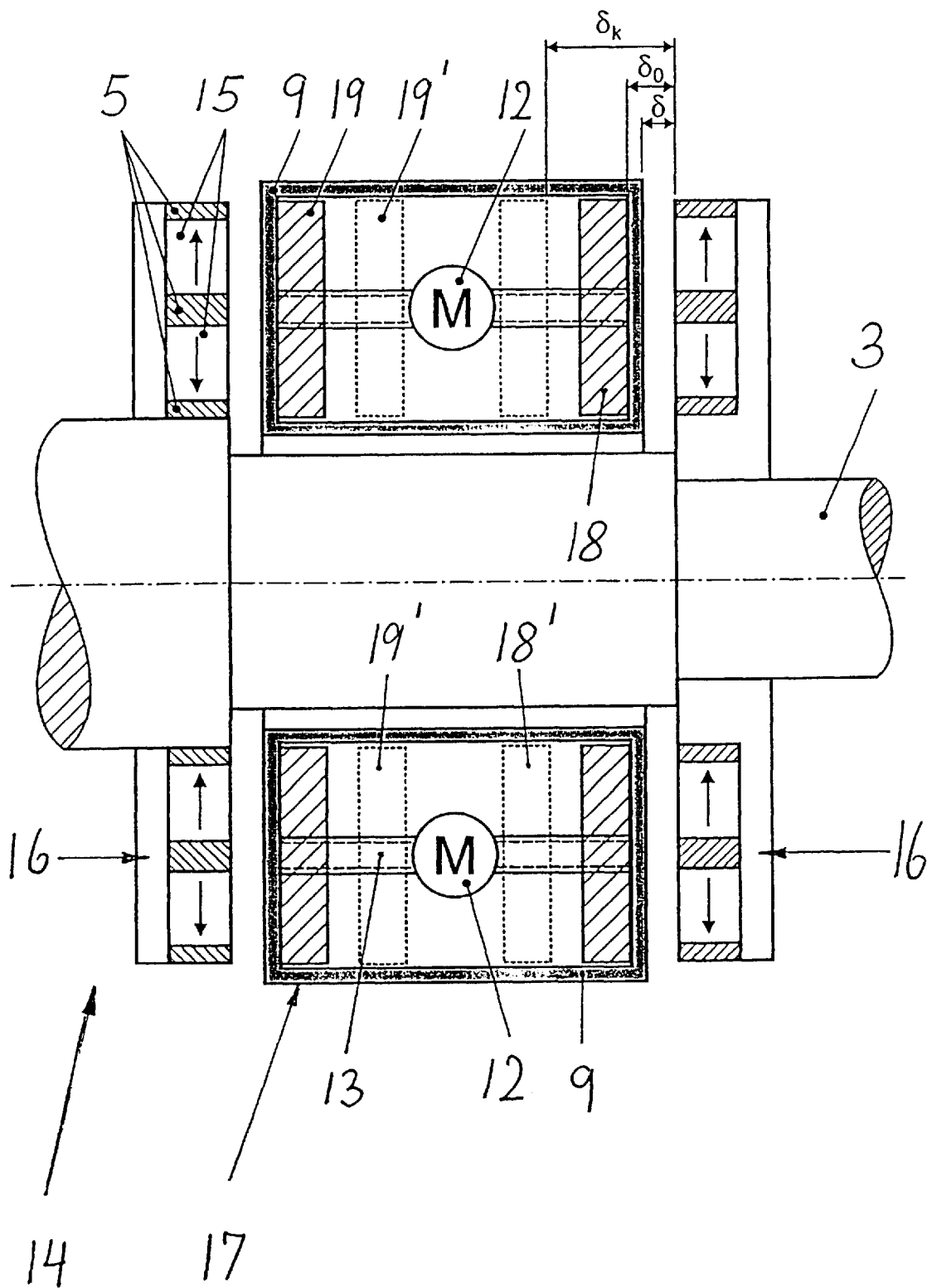
FIG. 3 is a longitudinal section through a magnetic axial bearing of a rotor.

FIG. 3 shows an axial bearing 14 for which additional provision may be made in addition to the radial magnetic bearing 1 described above.

The axial bearing 14 comprises the two axial exciting systems 16, which are arranged opposing each other with an axial spacing from each other and which each comprise the axial exciting system 16 fitted with the permanent magnets 15. Said exciting systems are forming an axially aligned, annular disk-shaped bearing effective area of the rotor part 3. A plane, annular disk-shaped HTSC axial bearing disk 18, 19 arranged coaxially with the rotor part 3 is associated with each of said two axial exciting systems 16 as the stator part 17. From a position shown by dashed lines in the hot state of the bearing, in which each HTSC 18', 19' axial bearing disk has a first axial distance $d_k$ from the associated axial exciting system 16, said axial bearing disks, after the transition into the superconducting state, can be shifted away from each other via an actuator 12 in the axial direction, into a working position shown by the fully drawn line with a second, smaller axial distance $d_0$ from the axial exciting system 16.

Aplying the cooling method described above in the same sense to an axial bearing is particularly advantageous because rigid guidance of the rotor is required in numerous applications especially with respect to the axial degree of freedom of the bearing. In realizing the axial bearing as defined by the invention it is possible in this connection to omit a division of the plane axial bearing surfaces; what matters is only an axial displacement of two bearing surfaces in opposite senses, whereby always two bearing areas opposing each other axially are braced against each other.

If an axial guidance of the rotor is secured via suitably designed radial bearing areas, it is useful when the HTSC half-shells 7, 8 are driven together via a suitable control or a suitably designed actuator so as to provide also for an axial displacement of the HTSC axial bearing disks, so that an initial tensioning can be achieved in the radial and axial directions at the same time.

The radial or axial, or, if need be, axial and radial initial tensioning of the bearing achieved as defined by the invention has an anisotropy of rigidity that is dependent upon the number of HTSC half-shells used in the radial magnetic bearing 1. When preferably two HTSC half-shells 7, 8 are used, different degrees of rigidity are obtained in the direction y of the normal (see FIG. 1) and in the direction x that is orthogonal in relation to the normal (see FIG. 1). Said anisotropy can be advantageously exploited when driving through critical numbers of revolution.

What is claimed is:

1. A magnetic radial bearing assembly of a rotor in a stator, having at least one magnetic bearing comprising:
   a stator part;
   a rotor part arranged coaxially with said stator part in an operating position without contacting said stator part;
   a radial exciting system having a permanent magnet and forming a bearing effective area of said rotor part;
   a high-temperature superconductor (HTSC) of said stator part concentrically surrounding said radial exciting system while maintaining an annular air gap, wherein said high-temperature superconductor is divided into at least two circle segment-shaped partial shells; and
   an actuator that displaces said at least two circle segment-shaped partial shells apart in a radial direction after a transition into a superconducting state;
   wherein said at least two circle segment-shaped partial shells are displaced from a position in a hot condition of said bearing, in which each HTSC partial shell has a first radial distance from said radial exciting system, into a working position with a second, smaller distance from said radial exciting system.

2. The magnetic radial bearing assembly according to claim 1, wherein said high-temperature superconductor (HTSC) is divided in two half-shells.

3. The magnetic radial bearing assembly according to claim 1, wherein said actuator comprises a motor spindle.

4. The magnetic radial bearing assembly according to claim 2, wherein said two half-shells have different first radial distances from said radial exciting system in a hot position.

5. A magnetic axial bearing assembly of a rotor in a stator, comprising;
   two axial exciting systems opposing each other and axially spaced from each other, wherein each axial exciting system is fitted with permanent magnets and forms an axially aligned, annular disk-shaped bearing effective area of a rotor part;
   a plane annular disk-shaped HTSC axial bearing disk associated with each of said bearing effective areas as a stator part; and
   an actuator that displaces said axial bearing disks apart from each other in an axial direction after a transition into a superconducting state;

wherein said axial bearing disks are displaced from a position in a hot state of said bearing, in which each HTSC axial bearing disk has a first axial distance from said associated axial exciting system, into a working position with a second, smaller axial distance from the axial exciting system.

6. The magnetic axial bearing assembly according to claim 5, wherein said actuator comprises motor spindle.

7. A magnetic bearing assembly of a rotor in a stator, comprising:

a) at least one magnetic radial bearing comprising;
   i) a stator part;
   ii) a rotor part arranged coaxially with said stator part in an operating position without contacting said stator part;
   iii) a radial exciting system having a permanent magnet and forming a bearing effective area of said rotor part;
   iv) a high-temperature superconductor (HTSC) of said stator part concentrically surrounding said radial exciting system while maintaining an annular air gap, wherein said high-temperature superconductor (HTSC) is divided into at least two circle segment-shaped partial shells; and
   v) an actuator that displaces said at least two circle segment-shaped partial shells apart in a radial direction after a transition into a superconducting state;

wherein said at least two circle segment-shaped partial shells are displaced from a position in a hot condition of said bearing, in which each HTSC partial shell has a first radial distance from said radial exciting system, into a working position with a second, smaller distance from said radial exciting system; and b) an axial bearing comprising:
   i) two axial exciting systems opposing each other and axially spaced from each other, wherein each axial exciting system is fitted with a plurality of permanent magnets and forms an axially aligned, annular disk-shaped bearing effective area of said rotor part;
   ii) a substantially flat annular disk-shaped HTSC axial bearing disk associated with each of said bearing effective areas acting as said stator part; and
   iii) an actuator that displaces said axial bearing disks apart from each other in an axial direction after a transition into a superconducting state;

wherein said axial bearing disks are displaced from a position in a hot state of said bearing, in which each HTSC axial bearing disk has a first axial distance from said associated axial exciting system, into a working position with a second, smaller axial distance from the axial exciting system.

8. The magnetic bearing assembly according to claim 7, further comprising a control that causes a simultaneous radial and axial displacement of said HTSC partial shells and of said HTSC axial bearing disks.

9. The magnetic bearing assembly according to claim 7, wherein said high-temperature superconductor is divided in two half-shells.

10. The magnetic bearing assembly according to claim 7, wherein said at least one of the actuators comprises a motor spindle.

11. The magnetic bearing assembly according to claim 9, wherein said two half-shells have different first radial distances from said radial exciting system in said hot position.

* * * * *